United States Patent [19]

Cramer

[11] Patent Number: 4,684,580
[45] Date of Patent: Aug. 4, 1987

[54] ELECTRIC STORAGE BATTERY ASSEMBLY
[76] Inventor: Scott L. Cramer, Hartland, Wis.
[21] Appl. No.: 820,025
[22] Filed: Jan. 21, 1986
[51] Int. Cl.[4] .......................................... H01M 10/42
[52] U.S. Cl. ...................................... 429/9; 429/149; 429/187
[58] Field of Search .................... 429/9, 149, 150, 151, 429/156, 157, 158, 159, 160, 179, 178, 123; 320/2, 6, 7, 19

[56] References Cited
U.S. PATENT DOCUMENTS

| | | |
|---|---|---|
| 1,313,384 | 8/1919 | Hutchinson et al. |
| 1,533,525 | 4/1925 | Deventer ............................ 429/149 |
| 2,395,652 | 2/1946 | Anderson ........................... 136/166 |
| 2,638,490 | 5/1953 | Snyder ............................... 429/156 |
| 2,902,532 | 9/1959 | Toce .................................. 136/171 |
| 3,200,014 | 8/1965 | Roberts .................................. 429/9 |
| 3,463,672 | 8/1969 | Schmidt .............................. 136/166 |
| 3,758,345 | 9/1973 | Toth ................................... 429/149 |
| 3,769,095 | 10/1973 | Schmidt ............................. 136/166 |
| 4,347,294 | 8/1982 | Mejia .................................. 429/151 |
| 4,555,451 | 11/1985 | Harrod et al. ....................... 429/178 |
| 4,564,797 | 1/1986 | Binkley .................................. 320/2 |
| 4,581,570 | 4/1986 | Mejia ..................................... 320/2 |

Primary Examiner—Donald L. Walton
Attorney, Agent, or Firm—Willis B. Swartwout, III

[57] ABSTRACT

An improved automotive type electric storage battery assembly including a primary storage battery of a conventional type having a casing providing a receptacle for a secondary, smaller storage battery. Each of the batteries are provided with conventional side mount or top mount positive and negative posts and the primary and second storage battery each are provided with a receptacle and plug mechanism respectively for quickly interconnecting the two batteries to obtain maximum cranking amperage. The secondary storage battery and primary storage battery casings are adapted for quick clamping and releasing mechanism requiring no tools such that the secondary battery may be easily removed and stored in a warm location in extreme cold conditions.

1 Claim, 4 Drawing Figures

4,684,580

ELECTRIC STORAGE BATTERY ASSEMBLY

BACKGROUND OF THE INVENTION

It is a well known fact that extreme cold weather causes storage battery failure. Sometimes this is a result of the age of the battery, weakness of battery acid, weakness of one of the cells, or inadequate electrical generating by the alternator or generator system. Often, however, particularly in northern climates the failure is either caused or substantially aided by the extreme temperatures that develop of ten or more degrees below zero.

Many attempts have been made to solve this problem. Heating systems for both the cooling system and the oil system have been developed. These are often costly and difficult to install. Also, they require an electrical outlet to be close at hand to plug into to make them functional. Such systems are usually installed in advance in the warm weather. Another solution is to remove the battery and take it indoors where it is warm.

While taking the battery indoors where it is warm sounds like a simple and inexpensive solution and indeed does accomplish the purpose of insuring that the battery will turn over the automobile starter and engine when reinstalled it is more difficult to accomplish than it sounds.

It is required that in extreme cold weather one must use metal tools to disconnect the battery cables and then lift out a very heavy object from a restricted location. The reverse procedure is required to reinstall.

SUMMARY OF THE INVENTION

The present invention proposes to overcome the aforementioned problems in a way superior to the prior art and at the same time in an extremely simple and inexpensive fashion. Furthermore, the present invention may be simply manually practiced without the need for any tools and without spending any additional time in the cold.

The present invention proposes to provide an improved automotive type electric storage battery assembly including a primary storage battery of a conventional type having a casing adapted to provide a receptacle for a secondary, smaller storage battery. Each of the batteries may be provided with conventional posts or side mount threaded openings for positive and negative connections to ground and to a source of current.

The primary storage battery is provided with a female two prong receptacle and the secondary storage battery is provided with a male two pronged plug at locations on the respective batteries that allows the easy insertion of the male plug into the female receptacle. In the preferred embodiment of the present invention shown in the drawings appended hereto, the secondary storage battery is provided with posts and the positive and negative posts are coupled to the male plug by conventional type cable wire.

The secondary storage battery could, however, also just as easily be provided with side mounts of the threaded variety.

The primary and secondary storage batteries are each generally rectangular in top plan view, with the rectangle of the secondary storage battery being at right angles or perpendicular to the rectangle of the primary storage battery. This construction is to provide that the short sides of the secondary storage battery be provided with slotted ears, projections or flanges which also provide a convenient receiving mechanism for a detachable carrying handle for the secondary storage battery.

From the foregoing description it can be easily seen that the present invention overcomes all of the problems of the prior art. The secondary storage battery can easily, manually be removed by unplugging the male member, releasing the spring clips, inserting a carrying handle if desired, and carrying the battery indoors where it is warm. The reverse procedure may be used when it is desired to start the vehicle in extreme cold weather.

A further object and advantage of the invention is that the coupling of the primary and secondary storage batteries provides increased "cold cranking power" as it is referred to in the automotive industry and this is especially true when the secondary storage battery is warm.

Another object of the present invention is that both the primary and the secondary storage battery are of a sufficient strength so that under ordinary weather conditions either will operate the starter and vehicle without the aid of the other. Thus, if one of the two batteries is totally discharged for some reason the vehicle will still be operable.

The foregoing and other objects and advantages of the present invention will appear from the following description reference is made to the accompanying drawings which form a part hereof and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 2:
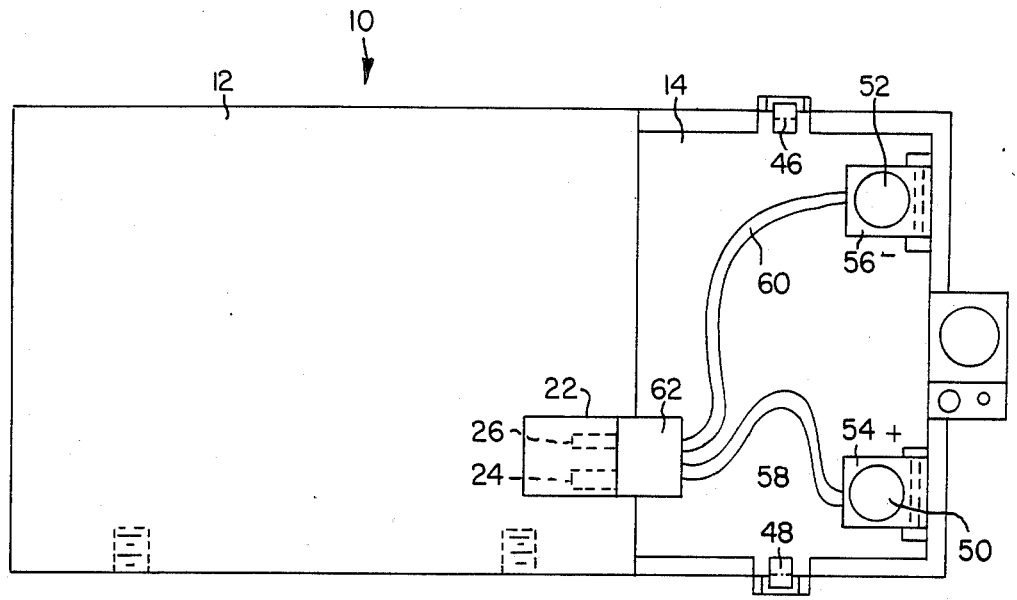
FIG. 2 is a top plan view of the structure shown in FIG. 1.
Figure 1:
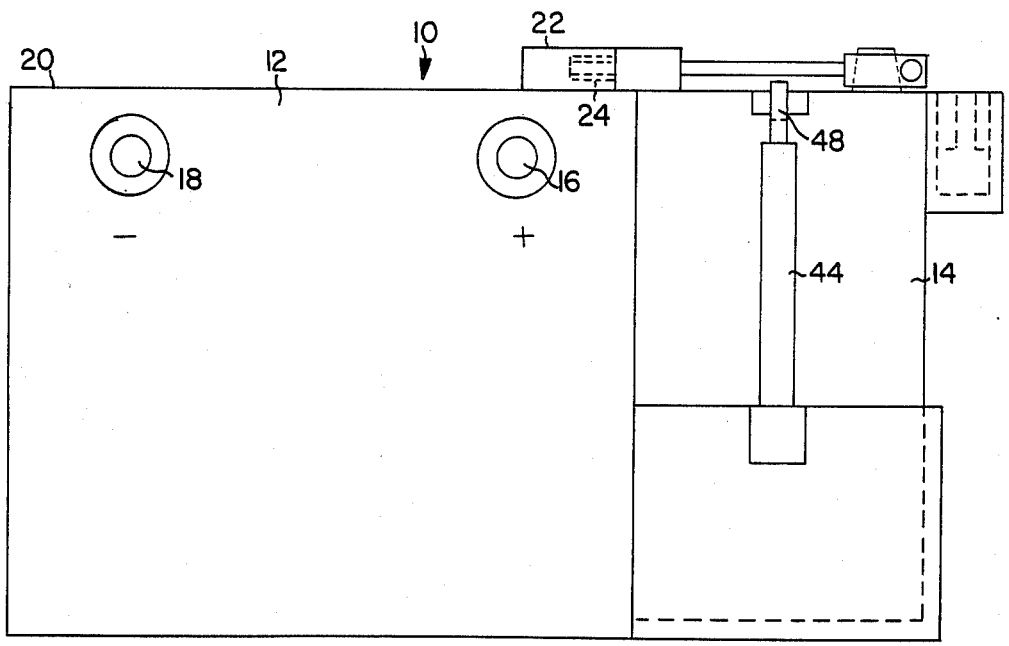
FIG. 1 is a side elevational view of battery structure embodying the present invention.
Figure 3:
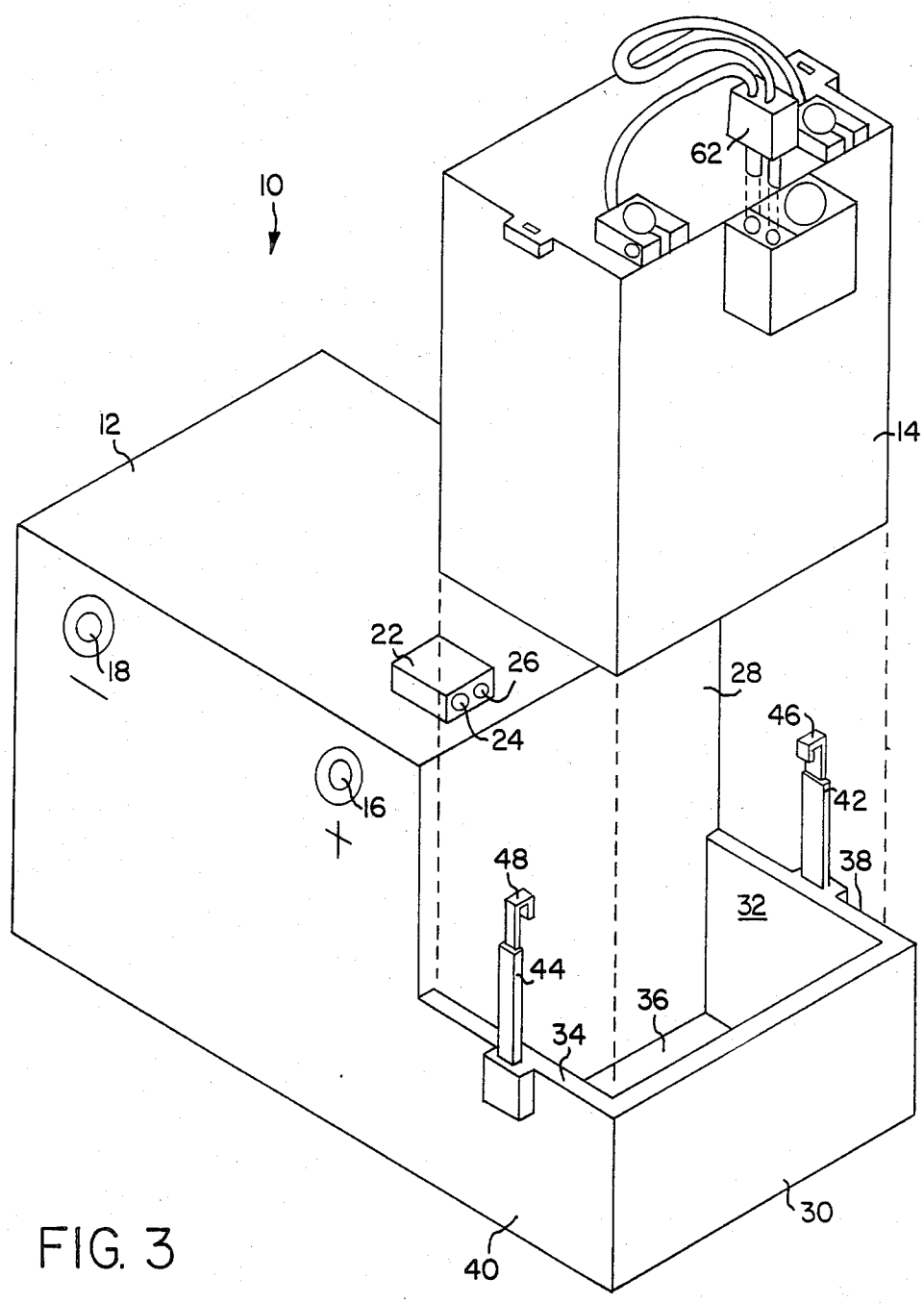
FIG. 3 is an isometric view of the structure shown in FIGS. 1 and 2 with the secondary storage battery shown removed from the primary storage battery receptacle as shown by the dotted lines showing the orientation of the primary and secondary storage batteries.

Referring now to the drawings and more particularly to FIGS. 1 and 2 thereof, an improved automotive type electric storage battery assembly embodying the present invention is shown and generally identified by the numeral 10.

Assembly 10 consists of a primary automotive type storage battery generally identified by the numeral 12, and a secondary automotive type storage battery generally identified by the numeral 14.

As can be seen from the drawings, both battery 12 and battery 14 are generally rectangular shaped in plan view and in elevational view.

Battery 12 is provided with two side mount battery poles. These poles are shown to be positive and negative and are numbered 16 and 18 respectively. They are of a well known threaded receptacle variety (not shown). Additionally, the top surface 20 of battery 12 is provided with a female coupling member 22 which has a positive receiver 24 and a negative receiver 26. Receivers 24 and 26 are electrically coupled in any suitable manner internally of the battery 12 with poles 16 and 18 respectively.

Battery 12 is further provided with rectangular walls 28, 30, 32 and 34 and a rectangular bottom wall 36 defining a rectangular receptacle adapted to receive battery 14 therein. Walls 32 and 34 are provided on their exterior surfaces 38 and 40 with spring clamps or clips 42 and 44 respectively having U-shaped extremities at one end denominated 46 and 48 respectively for a purpose that will hereinafter be described.

Battery 14 is provided with conventional battery posts, the positive post numbered 50 and the negative post numbered 52. A battery cable end 54 is coupled to post 50 and a battery cable end 56 is coupled to post 52. Cables 58 and 60 are connected at one end to ends 54 and 56 respectively and at the other ends to male plug member 62 so as to couple electrically with positive prong 64 and negative prong 66. Prongs 64 and 66 are adapted to fit into the positive and negative receivers 24 and 26 of female coupling member 22.

Figure 4:
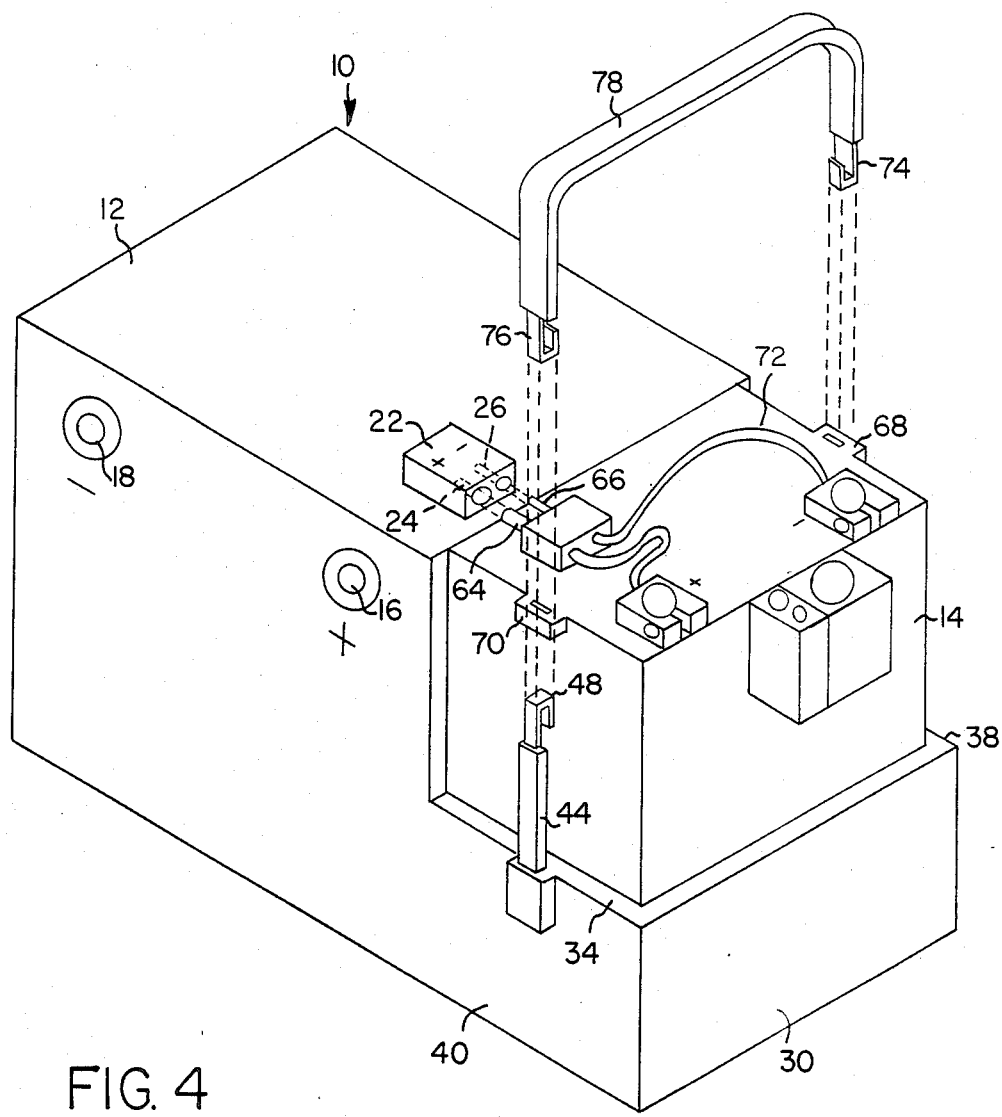
FIG. 4 is an isometric view similar to FIG. 3 with the secondary storage battery in place in the receptacle and the dotted lines used to show the orientation of the spring clamps and optional carrying handle to the secondary storage battery.

Battery 14, which is the secondary storage battery of assembly 10, is provided with a pair of slotted ears, projections or flanges 68 and 70, located at the longitudinal ends of battery 14 adjacent upper surface 72 thereof. Flanges 68 and 70 are adapted to receive the U-shaped extremities 46 and 48 of spring clamps or clips 42 and 44. Slotted flanges 68 and 70 are also adapted to receive the U-shaped hook ends 74 and 76 of carrying handle 78 shown in FIG. 4.

The entire assembly 10 is constructed to be of a small enough overall size as to fit in the battery tray or holder commonly found in today's automobiles.

I claim:
1. An automotive storage battery assembly including:
    (a) a primary storage battery provided with positive and negative poles;
    (b) a secondary storage battery having positive and negative poles;
    (c) a female coupling member adapted to be coupled to the positive and negative poles of one of said primary and secondary storage batteries and having a positive and negative receiver;
    (d) a male coupling member adapted to be coupled to the positive and negative poles of the other of said primary and secondary storage batteries and having protruding positive and negative prongs to frictionally engage with said positive and negative receivers to electronically couple said primary and secondary storage batteries in parallel;
    (e) walls of said primary storage battery casing defining an aperture having a dimension to snugly receive therein said secondary storage battery;
    (f) spring clamping members on said primary storage battery on two spaced sides of said primary storage battery defining the aperture therein;
    (g) slotted flanges on spaced ends of the top surface of said secondary storage battery, said flanges adapted to receive said clamping members; and
    (h) a carrying handle adapted to be received at either end in said slotted flanges when said spring clamping members are disengaged therefrom.

* * * * *